US012731988B2

(12) United States Patent
Tokusaki et al.

(10) Patent No.: US 12,731,988 B2
(45) Date of Patent: Sep. 8, 2026

(54) POWER CONVERSION DEVICE AND DC POWER SUPPLY SYSTEM

(71) Applicant: OMRON Corporation, Kyoto (JP)

(72) Inventors: Hiroyuki Tokusaki, Kyoto (JP); Masashi Doi, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 19/125,059

(22) PCT Filed: Nov. 2, 2023

(86) PCT No.: PCT/JP2023/039739
§ 371 (c)(1),
(2) Date: Apr. 28, 2025

(87) PCT Pub. No.: WO2024/106232
PCT Pub. Date: May 23, 2024

(65) Prior Publication Data

US 2026/0171796 A1 Jun. 18, 2026

(30) Foreign Application Priority Data

Nov. 17, 2022 (JP) ................................ 2022-184300

(51) Int. Cl.
*H02J 1/102* (2026.01)

(52) U.S. Cl.
CPC .................................... *H02J 1/102* (2013.01)

(58) Field of Classification Search
CPC .... H02J 1/102; H02J 3/381; H02J 3/32; H02J 2101/24; H02J 3/38; H02J 3/46;
(Continued)

(56) References Cited

U.S. PATENT DOCUMENTS

2013/0188399 A1* 7/2013 Tang ................. H02M 3/33576 363/21.1
2018/0062495 A1* 3/2018 Xu .......................... H02M 3/00
(Continued)

FOREIGN PATENT DOCUMENTS

CN 103219885 A 7/2013
CN 108054747 A 5/2018
(Continued)

OTHER PUBLICATIONS

International Search Report issued in International Appln. No. PCT/JP2023/039739 mailed Jan. 16, 2024.
(Continued)

*Primary Examiner* — Regis J Betsch
*Assistant Examiner* — Alex W Lam
(74) *Attorney, Agent, or Firm* — ROSSI, KIMMS & McDOWELL LLP

(57) ABSTRACT

A power conversion device connected to a DC power source and configured to output DC power, the power conversion device including: a physical quantity acquiring unit configured to acquire a physical quantity that is power or current flowing through the power conversion device; a voltage acquiring unit configured to acquire a voltage of the power line; and a control unit configured to control the voltage. The control unit includes: a droop control unit configured to perform a droop control of reducing the voltage in accordance with a droop 10 characteristic, a characteristic slope correction unit configured to correct a slope of the droop characteristic with respect to the physical quantity, and a characteristic reference shift setting unit configured to shift a reference point where the voltage and the physical quantity on the droop characteristic do not change when correcting the slope of the droop characteristic.

11 Claims, 8 Drawing Sheets

(58) Field of Classification Search
CPC .......... H02J 3/388; H02J 2101/20; H02J 1/14; H02J 2105/10; H02J 7/35; H02J 2101/10; H02J 3/14; H02J 7/34; H02J 7/82; H02J 2101/30
See application file for complete search history.

(56) References Cited

U.S. PATENT DOCUMENTS

| | | | | |
|---|---|---|---|---|
| 2018/0090984 | A1* | 3/2018 | Ku | H02J 9/061 |
| 2020/0403500 | A1* | 12/2020 | Golunski | H02J 1/102 |

FOREIGN PATENT DOCUMENTS

| | | | |
|---|---|---|---|
| JP | 2005168107 | A | 6/2005 |
| JP | 2021197823 | A | 12/2021 |

OTHER PUBLICATIONS

Written Opinion issued in International Appln. No. PCT/JP2023/039739 mailed Jan. 16, 2024.

Wang et al. “An Improved Distributed Secondary Control Method for DC Microgrids With Enhanced Dynamic Current Sharing Performance,” IEEE Transactions on Power Electronics, vol. 31, No. 9, Sep. 2016. Cited in specification.

* cited by examiner

POWER CONVERSION DEVICE AND DC POWER SUPPLY SYSTEM

TECHNICAL FIELD

The present invention relates to a power conversion device and a DC power supply system.

BACKGROUND OF INVENTION

In the related art, parallel operation control in a DC power supply system that supplies DC power using a plurality of converters with storage batteries as power sources is broadly categorized into the master-slave method and the droop control method.

Among these, the droop control method imparts a droop characteristic to the output voltage of each converter based on its output current. This allows for the design of a highly scalable system where the load current and output current autonomously balance, regardless of increases or decreases in the number of power sources connected in parallel. However, compared to the master-slave method, the droop control method has lower output voltage accuracy and does not allow arbitrary setting of the discharge current of the storage battery.

In contrast, the technology described in NPL 1 achieves the leveling of the discharge current of each converter by applying control that compensates for the slope of the droop characteristic based on the load factor of each converter. However, since the reference point of the droop characteristic is the no-load voltage, if there is an error in the intercept of the droop characteristic, the slope of the droop characteristic may be excessively corrected under light load conditions. As a result, the droop characteristics become misaligned during load change, thus leading to the issue of output current overshoot.

CITATION LIST

Patent Literature

PTL 1: CN108054747

Non-Patent Literature

NPL 1: IEEE Transaction on Power Electronics, Vol. 31, No. 9, September 2016 "An Improved Distributed Secondary Control Method for DC Microgrids With Enhanced Dynamic Current Sharing Performance"

SUMMARY

Technical Problem

In view of the above-mentioned problems, an object of the present invention is to provide a droop control technique that can suppress overshoot of the output current even during load change.

Solution to Problem

To solve the above-mentioned problems, a power conversion device according to the present invention is connected to a DC power source and configured to step-up, step-up and step-down, or step-down DC power and then output the DC power, the power conversion device being connected to a load through a power line in parallel to another power conversion device connected to another DC power source and configured to step-up, step-up and step-down, or step-down DC power, the power conversion device including: a physical quantity acquiring unit configured to acquire a physical quantity that is power or current flowing through the power conversion device; a voltage acquiring unit configured to acquire a voltage of the power line; and a control unit configured to control the voltage. The control unit includes: a droop control unit configured to perform a droop control of reducing the voltage of the power line in accordance with a droop characteristic that defines a relationship between the physical quantity and the voltage, a characteristic slope correction unit configured to correct a slope of the droop characteristic with respect to the physical quantity, and a characteristic reference shift setting unit configured to shift a reference point where the voltage and the physical quantity on the droop characteristic do not change when the slope of the droop characteristic is corrected.

In this manner, when the slope of the droop characteristic is corrected, the reference point where the voltage and the physical quantity included in the droop characteristic do not change is shifted. Specifically, the reference point is shifted, and the slope of the droop characteristic is corrected without changing the physical quantity and voltage value set as the reference point. Since the slope of the droop characteristic is changed in this manner, in a case where droop control is performed in accordance with the droop characteristic whose slope is corrected, the value of the physical quantity to be subjected to the droop control becomes more gradual in slope of the droop characteristic to the extent that the reference point is shifted in comparison with the case where the slope of the droop characteristic is corrected with the value of physical quantity of the reference point set to 0, and excessive correction of the slope is suppressed even if there are variations in the droop characteristic. In this manner, even in a case where a plurality of power conversion devices is connected in parallel to a load, the overshoot of current or power due to load change can be suppressed.

In the present invention, the characteristic reference shift setting unit may change a direction of shifting the reference point with respect to a range of a value of the physical quantity to be subjected to the droop control in accordance with a direction of the physical quantity flowing through the power conversion device.

In this manner, when the flowing direction of the physical quantity toward the load in the power conversion device is set as the positive direction and the flowing direction toward the DC power source in the power conversion device as the negative direction, the reference point may be shifted to the region where the physical quantity is negative when the physical quantity to be subjected to the droop control is 0 or in the positive range, whereas the reference point may be shifted to the region where the physical quantity is positive when the physical quantity to be subjected to the droop control is 0 or in the negative range. By shifting the reference point in this manner to correct the slope without changing the physical quantity and voltage value set as the reference point, the slope of the droop characteristic becomes more gradual regardless of the direction of the physical quantity flowing through the power conversion device to the extent that the reference point is shifted in comparison with the case where the slope of the droop characteristic is corrected with the value of physical quantity of the reference point set to 0, and excessive correction of the slope is suppressed even if there are variations in the droop characteristic. In this manner, even in a case where a plurality of power conversion devices is connected in parallel to a load, the overshoot of current or power due to load change can be suppressed.

In the present invention, the characteristic reference shift setting unit may dynamically set a shift amount of the reference point.

In this manner, the shift amount of the reference point for correcting the slope of the droop characteristic is dynamically set in accordance with the operation state of the power conversion device, and thus the slope is corrected without changing the physical quantity and voltage value set as the reference point. As a result, even if there are variations in the droop characteristic, the excessive correction of the slope can be appropriately suppressed in accordance with the operation state of the power conversion device. In this manner, even in a case where a plurality of power conversion devices is connected in parallel to a load, the overshoot of current or power during load change can be suppressed.

In the present invention, the characteristic reference shift setting unit may set a shift amount of the reference point based on a power capacity of the power conversion device.

In this manner, the correction of the slope of the droop characteristic in accordance with the power capacity of the power conversion device can be achieved.

In the present invention, a communication unit configured to acquire another physical quantity that is power or current flowing through the other power conversion device may be further provided. The control unit may determine a command value of the physical quantity in the power conversion device based on the physical quantity and the other physical quantity.

In this manner, the command value of the physical quantity is determined on the basis of the physical quantity and other physical quantity, and the characteristic slope correction unit corrects the slope of the droop characteristic, and thus, droop control that takes into account the load-sharing ratio between the power conversion device and other power conversion devices can be achieved.

A DC power supply system according to the present invention includes a plurality of power conversion devices each connected to a DC power source and configured to step-up, step-up and step-down, or step-down DC power and supply the DC power to a load, the plurality of power conversion devices being connected in parallel to the load. The plurality of power conversion devices includes a first-type power conversion device, the first-type power conversion device includes: a physical quantity acquiring unit configured to acquire a physical quantity that is power or current flowing through the first-type power conversion device, a voltage acquiring unit configured to acquire a voltage of a power line that connects the first-type power conversion device and the load, and a control unit configured to control the voltage, and the control unit includes: a droop control unit configured to perform a droop control of reducing the voltage in accordance with a droop characteristic that defines a relationship between the physical quantity and the voltage, a characteristic slope correction unit configured to correct a slope of the droop characteristic with respect to the physical quantity, and a characteristic reference shift setting unit configured to shift a reference point where the voltage and the physical quantity on the droop characteristic do not change when the slope of the droop characteristic is corrected.

In this manner, when the slope of the droop characteristic is corrected, the reference point where the voltage and the physical quantity included in the droop characteristic do not change is shifted. Specifically, the reference point is shifted, and the slope of the droop characteristic is corrected without changing the physical quantity and voltage value set as the reference point. Since the slope of the droop characteristic is changed in this manner, in a case where droop control is performed in accordance with the droop characteristic whose slope is corrected, the value of the physical quantity to be subjected to the droop control becomes more gradual in slope of the droop characteristic to the extent that the reference point is shifted in comparison with the case where the slope of the droop characteristic is corrected with the value of physical quantity of the reference point set to 0, and excessive correction of the slope is suppressed even if there are variations in the droop characteristic. In this manner, in a DC power supply system in which a plurality of power conversion devices including the first-type power conversion device is connected in parallel to the load, the overshoot of current or power during load change can be suppressed.

In the present invention, the plurality of power conversion devices may include a second-type power conversion device, the second-type power conversion device includes: a second-type physical quantity acquiring unit configured to acquire a second-type physical quantity that is power or current flowing through the second-type power conversion device, a second-type voltage acquiring unit configured to acquire a second-type voltage that is a voltage of a second-type power line configured to connect the second-type power conversion device and the load, and a second-type control unit configured to control the second-type voltage, and the second-type control unit may include: a second-type droop control unit configured to perform a second-type droop control of reducing the second-type voltage in accordance with a second-type droop characteristic that defines a relationship between the second-type physical quantity and the second-type voltage, and a second-type characteristic slope correction unit configured to correct a slope of the second-type droop characteristic with respect to the second-type physical quantity.

In this manner, when the slope of the droop characteristic is corrected, in the DC power supply system in which a plurality of power conversion devices including the first-type power conversion device that shifts the reference point where the voltage and the physical quantity included in the droop characteristic do not change, and a second-type power conversion device that corrects the slope of the droop characteristic but does not shift the reference point is connected in parallel to the load, the overshoot of current or power during load change can be suppressed.

In the present invention, the characteristic reference shift setting unit may change a direction of shifting the reference point with respect to a range of a value of the physical quantity to be subjected to the droop control in accordance with a direction of the physical quantity flowing through the first-type power conversion device.

In this manner, when the flowing direction of the physical quantity toward the load in the first-type power conversion device is set as the positive direction and the flowing direction toward the DC power source in the first-type power conversion device as the negative direction, the reference point may be shifted to the region where the physical quantity is negative when the physical quantity to be subjected to the droop control is 0 or in the positive range, whereas the reference point may be shifted to the region where the physical quantity is positive when the physical quantity to be subjected to the droop control is 0 or in the negative range. By shifting the reference point in this manner to correct the slope without changing the physical quantity and voltage value set as the reference point, the slope of the droop characteristic becomes more gradual regardless of the direction of the physical quantity flowing through the first-type power conversion device to the extent that the reference point is shifted in comparison with the case where the slope of the droop characteristic is corrected with the value of physical quantity of the reference point set to 0, and excessive correction of the slope is suppressed even if there are variations in the droop characteristic. In this manner, in a DC power supply system in which a plurality of power conversion devices including the first-type power conversion device is connected in parallel to the load, the overshoot of current or power due to load change can be suppressed.

In the present invention, the characteristic reference shift setting unit may dynamically set a shift amount of the reference point.

In this manner, the shift amount of the reference point for correcting the slope of the droop characteristic is dynamically set in accordance with the operation state of the first-type power conversion device, and thus the slope is corrected without changing the physical quantity and voltage value set as the reference point. As a result, even if there are variations in the droop characteristic, the excessive correction of the slope can be appropriately suppressed in accordance with the operation state of the first-type power conversion device. In this manner, in a DC power supply system in which a plurality of power conversion devices including the first-type power conversion device is connected in parallel to the load, the overshoot of current or power during load change can be suppressed.

In the present invention, the characteristic reference shift setting unit may set a shift amount of the reference point based on a power capacity of the first-type power conversion device.

In this manner, the correction of the slope of the droop characteristic in accordance with the power capacity of the first-type power conversion device can be achieved.

In the present invention, the first-type power conversion device may further include a communication unit configured to acquire another physical quantity that is power or current flowing through another power conversion device included in the DC power supply system, and the control unit may determine a command value of the physical quantity in the first-type power conversion device based on the physical quantity and the other physical quantity.

In this manner, the command value of the physical quantity is determined on the basis of the physical quantity and other physical quantity, and the characteristic slope correction unit corrects the slope of the droop characteristic, and thus, droop control that takes into account the load-sharing ratio of a plurality of power conversion devices including the first-type power conversion device can be achieved.

Advantageous Effects of Invention

According to the present invention, it is possible to provide a droop control technique that can suppress overshoot of the output current even during load change.

DESCRIPTION OF EMBODIMENTS

Application Example

Hereinafter, an application example of the present invention will be described with reference to the drawings.

Figure 1:
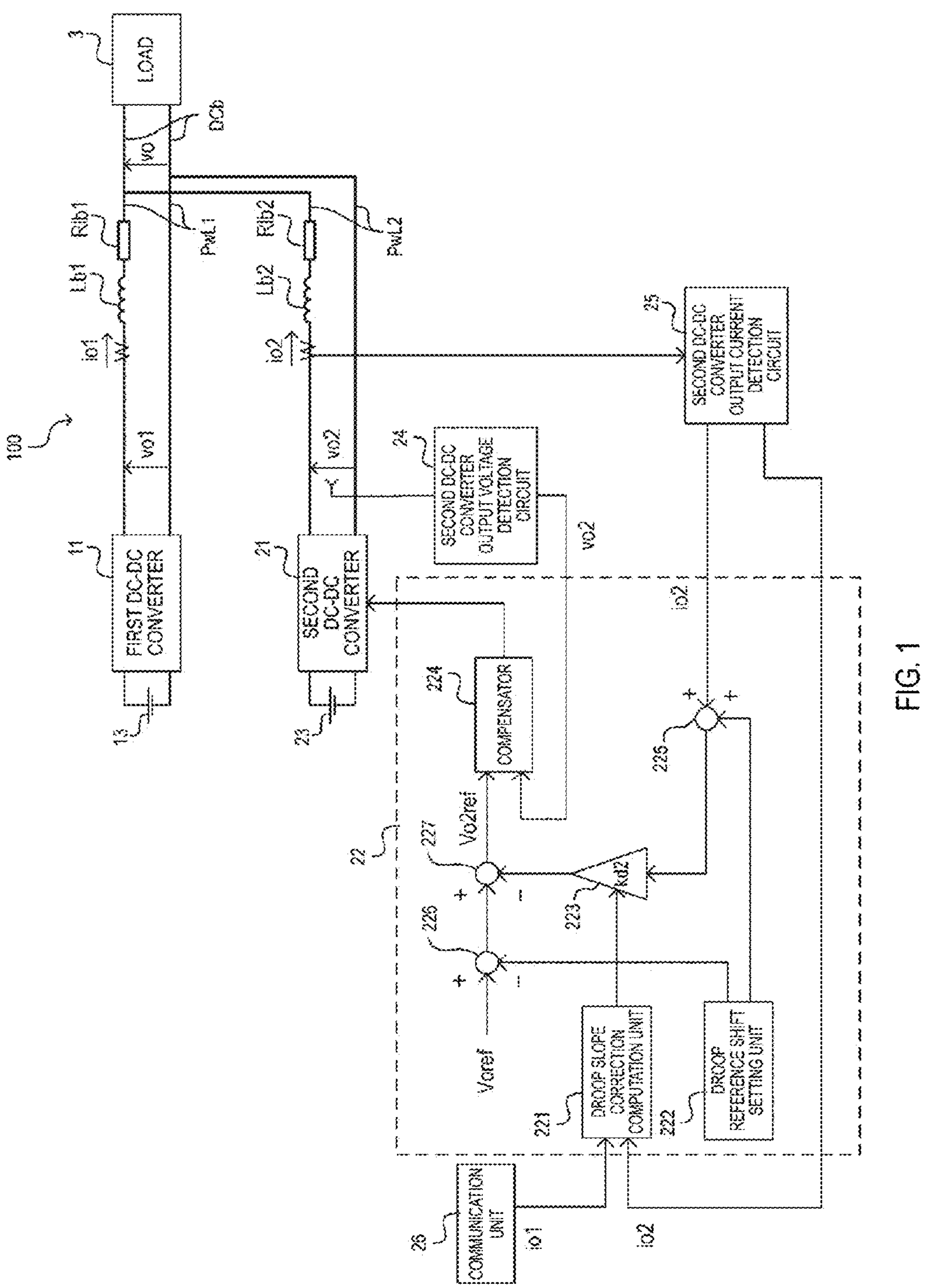
FIG. 1 is a diagram illustrating a schematic configuration of a DC power supply system according to Example 1 of the present invention.

FIG. 1 is a diagram illustrating a schematic configuration of a DC power supply system 100 according to an application example of the present invention. The DC power supply system 100 includes a first DC-DC converter 11 that steps-up, steps-up and steps-down, or steps-down a DC power voltage discharged from a storage battery 13 and outputs it, and a second DC-DC converter 21 that steps-up, steps-up and steps-down, or steps-down a DC power voltage discharged from a storage battery 23 and outputs it, and supplies DC power to a load 3 by operating in parallel the first DC-DC converter 11 and the second DC-DC converter 21 connected in parallel to the load 3.

The second DC-DC converter 21 includes a control unit 22, a second DC-DC converter output voltage detection circuit 24, a second DC-DC converter output current detection circuit 25, and a communication unit 26. The control unit 22 includes a droop slope correction computation unit 221, a droop reference shift setting unit 222, a droop gain (kd2) multiplier 223, a compensator 324, and summation points 225, 226 and 227.

The control unit 22 of the second DC-DC converter 21 performs a droop control of reducing the output voltage on the basis of the second DC-DC converter output current detection circuit 25. In the droop control according to this application example, the slope of the droop characteristic is corrected by the correction amount calculated at the droop slope correction computation unit 221 on the basis of output current values io1 and io2 of the first DC-DC converter 11 and the second DC-DC converter 21. The reference point for correcting the slope of the droop characteristic is shifted in accordance with the setting in the droop reference shift setting unit 222. At the summation point 225, the output current value io2 is shifted in accordance with the shift of the reference point, and at the summation point 226, a DC bus voltage command value Voref is shifted in accordance with the shift of the reference point, and, at the summation point 227, an output voltage command value of the second DC-DC converter 21 corresponding to the droop characteristic whose slope is corrected is output.

Figure 2A:
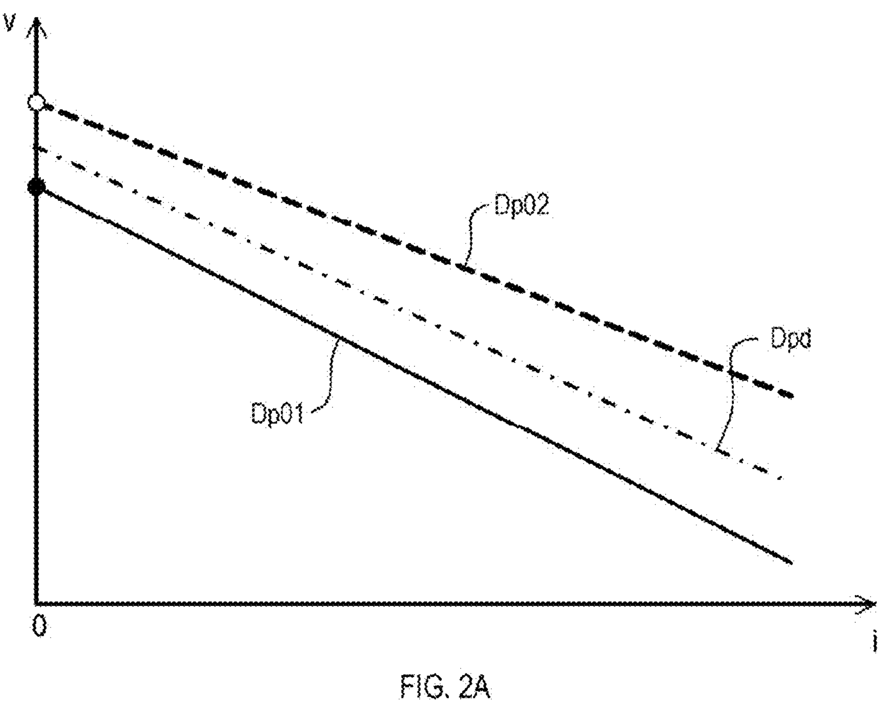
FIG. 2 are diagrams for describing the correction of the droop characteristic of prior art.
Figure 2B:
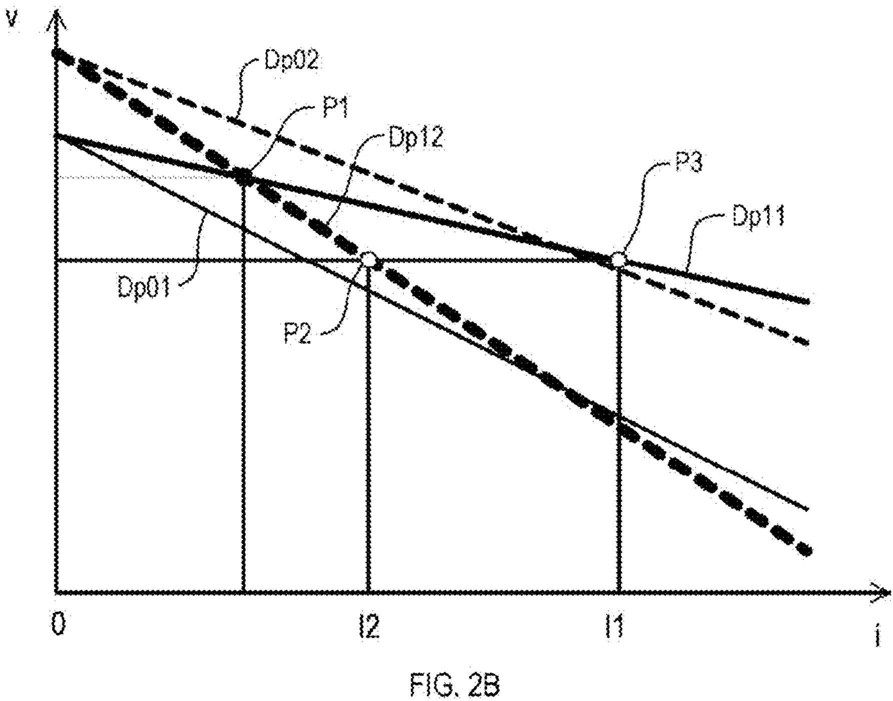

An overview of the droop characteristic of the DC power supply system 100 according to this application example is described below with reference to FIGS. 2A and 2B and FIGS. 3A and 3B. FIGS. 2A and 2B illustrate, for comparison, the correction of the droop characteristic in the technique disclosed in NPL 1 (also referred to simply as "prior art"). In FIG. 2A, droop characteristic Dp01 and droop characteristic Dp02 represent the droop characteristic before correction of the first DC-DC converter 11 and the second DC-DC converter 21, respectively. As illustrated in FIG. 2A, at the first DC-DC converter 11 and the second DC-DC converter 21, the droop characteristic Dp01 and the droop characteristic Dp02 are shifted from a droop characteristic Dpd of the designed value due to a detection error or the like.

FIG. 2B illustrates an exemplary case where the slope of the droop characteristic is corrected by prior art. The slope of the droop characteristic is corrected by a light load indicated by a black circle P1. In a case of correcting the droop characteristic, the intersection (intercept) of the droop characteristic and the vertical axis at no load (i=0) is used as a reference, and the slope of the droop characteristic is corrected while keeping the value of this intersection of the droop characteristic and the vertical axis without any change. Here, a droop characteristic Dp11 and a droop characteristic Dp12 represent the droop characteristic after correction of the first DC-DC converter 11 and the second DC-DC converter 21, respectively. When load change occurs in a case where droop control of the first DC-DC converter 11 and the second DC-DC converter 21 is performed on the basis of such the droop characteristic after correction, the output current io1 of the first DC-DC converter 11 becomes a current value 11 indicated by a white circle P3 in accordance with the droop characteristic Pp11 after correction, and the output current io2 of the second DC-DC converter 21 becomes a current value 12 indicated by a white circle P2 in accordance with the droop characteristic Dp12 after correction, for example. In this manner, when load change occurs, current imbalance occurs between the first DC-DC converter 11 and the second DC-DC converter 21, and the first DC-DC converter 11 may have a peak (overshoot) in its output current.

Figure 3A:
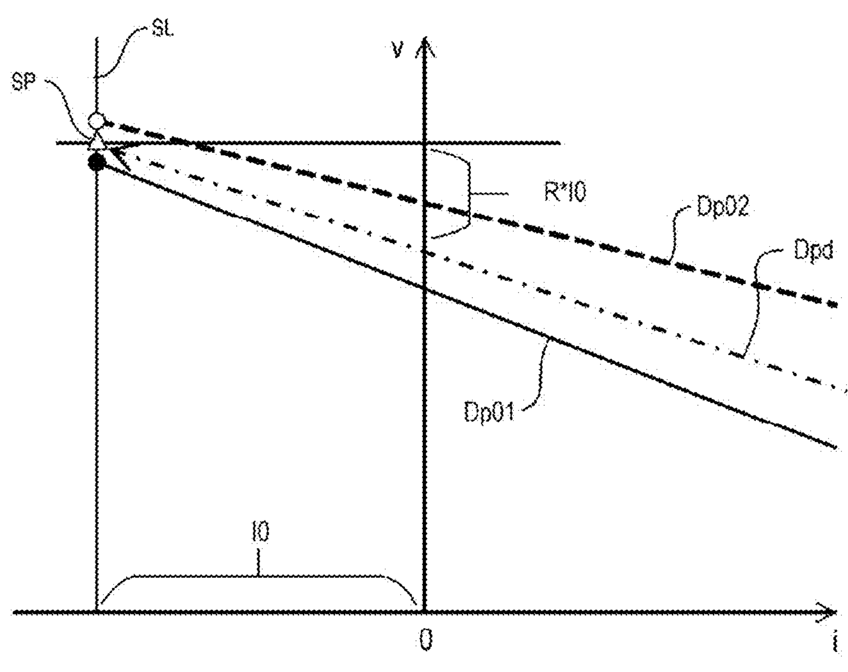
FIG. 3 are diagrams for describing the correction of the droop characteristic according to Example 1 of the present invention.
Figure 3B:
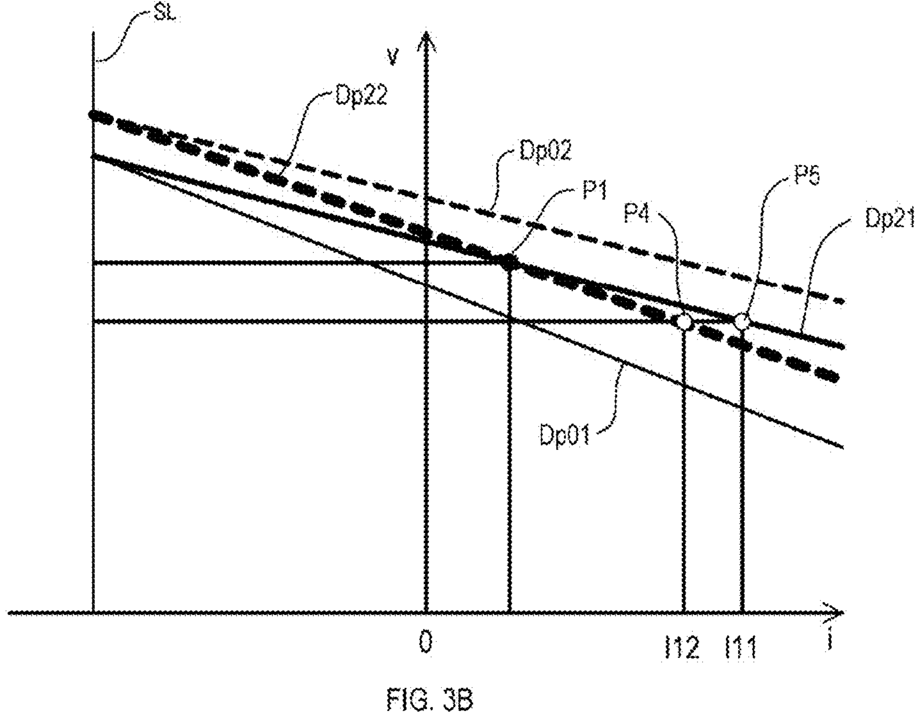

FIGS. 3A and 3B are diagrams for describing correction of the slope of the droop characteristic in this application example.

In this application example, the droop characteristic is extended to the left side of the vertical axis representing no load, and the slope of the droop characteristic is corrected with a reference line SL, which is parallel to the vertical axis at a position shifted by 10 to the left side of the vertical axis, as a reference. When R represents the slope of the droop characteristic Dpd of the designed value, the voltage value at the intersection of the droop characteristic Dpd of the designed value and the vertical axis representing no load decreases by R*I0 in comparison with the voltage value at the intersection SP of the extension of the droop characteristic Dpd of the designed value and the reference line SL.

FIG. 3B illustrates an example in which the slope of the droop characteristic is corrected with the intersection SP of the droop characteristic Dpd and the reference line SL as a reference. Here, a droop characteristic Dp21 of the first DC-DC converter 11 after correction is indicated by the thick solid line, and a droop characteristic Dp22 of the second DC-DC converter 21 after correction is indicated by the thick broken line. As with prior art, even when the droop characteristic is corrected in the light load state indicated by the black circle P1, the slope of the droop characteristic Dp21 and Dp22 becomes smaller than in the case where the intersection of the droop characteristic Dpd and the vertical axis is used as a reference by correcting the slope of the droop characteristic Dpd in the state where the value at the intersection SP of the droop characteristic Dpd and the reference line SL is kept with no change with the intersection SP of the droop characteristic Dpd and the reference line SL as a reference. In this manner, when the load change has occurred as in the case described with reference to FIG. 2B, the output current io1 of the second DC-DC converter 21 becomes the current value 111 indicated by a white circle P5 in accordance with the droop characteristic Dp21 after correction, and the output current io2 of the second DC-DC converter 21 becomes the current value 112 indicated by a white circle P4 in accordance with the droop characteristic Dp22 after correction. Specifically, even when load change has occurred, the current imbalance can be suppressed between the first DC-DC converter 11 and the second DC-DC converter 21, and the peak (overshoot) of the output current can be suppressed.

Example 1

The DC power supply system 100 according to Example 1 of the present invention is elaborated below with reference to the drawings. However, the configuration of the apparatus and the system described in the present example should be changed as appropriate in accordance with various conditions. That is, the scope of the present invention is not intended to be limited to the present example described blow.

FIG. 1 is a diagram illustrating schematic configurations of the control unit 22 and the first DC-DC converter 11 and the second DC-DC converter 21 making up the DC power supply system 100 according to Example 1 of the present invention. The control unit of the first DC-DC converter 11 also has components similar to those of the control unit 22 of the second DC-DC converter 21, but description thereof is omitted. In the illustration of FIG. 1, the second DC-DC converter 21 and the control unit 22 are separated for the sake of description, but as a specific apparatus, the control unit 22 is housed in the housing of the second DC-DC converter 21 (the same applies to the DC-DC converter described below). Here, the DC power supply system 100 corresponds to the DC power supply system of the present invention, and the first DC-DC converter 11 and the second DC-DC converter 21 correspond to the power conversion device and the first-type power conversion device of the present invention. In addition, when the second DC-DC converter 21 corresponds to the power conversion device of the present invention, the first DC-DC converter 11 corresponds to the other power conversion device of the present invention, the first DC-DC converter 11 to the power conversion device of the present invention, and the second DC-DC converter 21 to the other power conversion device of the present invention.

The DC power supply system 100 includes the first DC-DC converter 11 that steps-up, steps-up and steps-down, or steps-down a DC power voltage discharged from the storage battery 13 and outputs it, and the second DC-DC converter 21 that steps-up, steps-up and steps-down, or steps-down a DC power voltage discharged from the storage battery 23 and outputs it. In the DC power supply system 100, the two converters, the first DC-DC converter 11 and the second DC-DC converter 21, are connected parallel to the load 3 through a DC bus DCb, and they are operated in parallel to supply DC power to the load 3. While FIG. 1 illustrates the DC power supply system 100 including the first DC-DC converter 11 and the second DC-DC converter 21 respectively connected to the two storage batteries 13 and 23, the DC power supply system 100 may include three or more storage batteries and DC-DC converters connected in parallel. Further, various distributed power sources may also be employed as a DC power source, and the storage battery is not limitative. Here, the storage batteries 13 and 23 correspond to the power source of the present invention DC. Here, the first DC-DC converter 11 and the second DC-DC converter 21 correspond to a plurality of power conversion devices of the present invention.

The first DC-DC converter 11 is connected to the load 3 through the DC bus DCb and an output line PwL1 of the first DC-DC converter 11, and the second DC-DC converter 21 is connected to the load 3 through the DC bus DCb and the output line PwL2 of the second DC-DC converter 21. Here, an inductance Lb1 and a resistance Rlb1 represent the inductance component and resistance component of the wiring impedance of the output line PwL1. In addition, an inductance Lb2 and a resistance Rlb2 represent the inductance component and resistance component of the wiring impedance of the output line PwL2.

The second DC-DC converter 21 includes the control unit 22, the second DC-DC converter output voltage detection circuit 24, the second DC-DC converter output current detection circuit 25, and the communication unit 26. The control unit 22 includes the droop slope correction computation unit 221, the droop reference shift setting unit 222, the droop gain (kd2) multiplier 223, the compensator 324, and the summation points 225, 226 and 227. The control unit 22 may include a computer including a CPU (Central Processing Unit) and memory, a DSP (Digital Signal Processor), an ASIC (Application-Specific Integrated Circuit), and the like. Some or all of the functions of each unit may be implemented by executing software on hardware or may be implemented by dedicated hardware.

The second DC-DC converter output voltage detection circuit 24 detects an output voltage vo2, which is the voltage between the output lines PwL2 of the second DC-DC converter 21. A second DC-DC converter output current detection circuit 35 detects current (second DC-DC converter output current) io2 flowing through the output line PwL2 of the second DC-DC converter 21. The communication unit 26 is an interface that performs communication with an external apparatus including the first DC-DC converter 11 using an appropriate communication method. The output line PwL2 corresponds to the power line of the present invention, the output voltage vo2 as the voltage between the output lines PwL2 corresponds to the voltage of the power line of the present invention, and the second DC-DC converter output voltage detection circuit 24 corresponds to the voltage acquiring unit of the present invention. In addition, the output current io2 flowing through the output line PwL2 corresponds to the current and physical quantity flowing through the power conversion device of the present invention, and the second DC-DC converter output current detection circuit 35 corresponds to the physical quantity acquiring unit of the present invention.

An output voltage value vo2 of the second DC-DC converter 21 detected by the second DC-DC converter output voltage detection circuit 24 is input to a compensator 224.

In addition, the output current value io2 of the second DC-DC converter 21 detected by the second DC-DC converter output current detection circuit 25 is input to the summation point 225 and the droop slope correction computation unit 221. At the summation point 225, the output current value io2 of the second DC-DC converter 21 and an output current shift value 10 set by the droop reference shift setting unit 222 are added together, and output to the droop gain (kd2) multiplier 223.

Together with the output current io2 of the second DC-DC converter 21, the output current io1 of the first DC-DC converter 11 acquired from the first DC-DC converter 11 through the communication unit 26 is input to the droop slope correction computation unit 221. The droop slope (the slope of the droop characteristic with respect to the output current) correction value computed at the droop slope correction computation unit 221 is input to the droop gain (kd2) multiplier 223 (appropriate methods of prior art and the like may be employed as the correction of the slope of the droop characteristic, and therefore description thereof is omitted). At the droop gain (kd2) multiplier 223, the droop slope computed at the droop slope correction computation unit 221 is multiplied by the sum of the output current value io2 and the output current shift value 10, and output to the summation point 227. A DC bus voltage shift value output from the droop reference shift setting unit 222 is input to the summation point 226. The output current value io2 detected by the second DC-DC converter output current detection circuit 25 may be output to the first DC-DC converter 11 through the communication unit 26. The communication unit 26 corresponds to the communication unit of the present invention.

At the summation point 226, the DC bus voltage shift value is added to the DC bus voltage command value Voref, and output to the summation point 227. At the summation point 227, an output voltage command value Vref2 of the second DC-DC converter 21 obtained by subtracting the output value of the droop gain (kd2) multiplier 223 from the sum of the DC bus voltage command value Voref and the DC bus voltage shift value is output, and input to the compensator 224. At the compensator 224, a duty command value Dref2 of the second DC-DC converter 21 is generated on the basis of the deviation between the output voltage command value Vref2 of the second DC-DC converter 21 and the output voltage value vo2 of the second DC-DC converter 21, and the second DC-DC converter 21 is controlled on the basis of the duty command value Dref2.

Now details of droop control of the second DC-DC converter 21 illustrated in FIG. 1 are described.

It is assumed here that the output current shift value set at the droop reference shift setting unit 222 is I0. In this case when R represents a designed value of the slope of the droop characteristic, the DC bus voltage shift value is R*I0 as described later. At the droop reference shift setting unit 222, a pre-stored value, or a value calculated using a predetermined expression based on various acquired information may be set as the output current shift value. Here, the output current shift value I0 corresponds to the reference point shift amount of the present invention.

As described above, the output current shift value 10 and the output current value io2 are added together at the summation point 225, and an output current value after shift (I0+io2) is input to the droop gain (kd2) multiplier 223 from the summation point 225. At the droop slope correction computation unit 221, a slope correction value k of the droop characteristic is output on the basis of the output current value io1 of the first DC-DC converter 11 and the output current value io2 of the second DC-DC converter 21. The slope correction value k of the droop characteristic output from the droop slope correction computation unit 221 is input to the droop gain (kd2) multiplier 223. Then, at the droop gain (kd2) multiplier 223, a sum R+k with a designed value R of the slope of the droop characteristic is multiplied by the output current value after shift (I0+io2) as a droop gain kd2, and input to the summation point 227 as a final voltage command value correction amount ΔVd2.

At the summation point 226, the DC bus voltage shift value R*I0 is added to the DC bus voltage command value Voref, and the DC bus voltage command value Voref+R*I0 after shift is input to the summation point 227. At the summation point 227, the final voltage command value correction amount ΔVd2 is subtracted from the DC bus voltage command value Voref+R*I0 after shift and it is input to the compensator 224 as the final output voltage command value Vref2 of the second DC-DC converter 21.

Here, the droop characteristic of the second DC-DC converter 21 represented by the droop gain kd2 corresponds to the droop characteristic of the present invention, the droop control corresponding to this corresponds to the droop control of the present invention, and the droop gain multiplier 223 and the summation point 227 correspond to the droop control unit of the present invention. For example, the intersection SP of FIG. 3 corresponds to the reference point of the present invention. In addition, the control unit 22 corresponds to the control unit of the present invention, the droop slope correction computation unit 221 corresponds to the characteristic slope correction unit of the present invention, and the droop reference shift setting unit 222, the summation point 225 and the summation point 226 correspond to the characteristic reference shift setting unit of the present invention.

Now effects of the correction of the droop characteristic in the present example are described.

FIGS. 2A and 2B illustrate, for comparison, the correction of the droop characteristic in the technique disclosed in NPL 1 (also referred to simply as "prior art"). In FIG. 2A, the droop characteristic Dp01 of the first DC-DC converter 11 before correction is indicated by the solid line, and the droop characteristic Dp02 of the second DC-DC converter 21 before correction is indicated by the broken line. In addition, the droop characteristic Dpd of the designed value is indicated by the single dotted line. As illustrated in FIG. 2A, at the first DC-DC converter 11 and the second DC-DC converter 21, the droop characteristic Dp01 and the droop characteristic Dp02 are shifted from the droop characteristic Dpd of the designed value due to a detection error or the like.

FIG. 2B illustrates an exemplary case where the slope of the droop characteristic is corrected by prior art. The slope of the droop characteristic is corrected by a light load indicated by the black circle P1. In a case of correcting the droop characteristic, the intersection (intercept) of the droop characteristic and the vertical axis at no load (i=0) is used as a reference, and the slope of the droop characteristic is corrected while keeping the value of this intersection of the droop characteristic and the vertical axis without any change. At this time, the droop characteristic Dp11 of the first DC-DC converter 11 after correction is indicated by the thick solid line, and the droop characteristic Pp12 of the second DC-DC converter 21 after correction is indicated by the thick broken line. When load change occurs in a case where droop control of the first DC-DC converter 11 and the second DC-DC converter 21 is performed on the basis of such the droop characteristic after correction, the output current io1 of the first DC-DC converter 11 becomes the current value 11 indicated by the white circle P3 in accordance with the droop characteristic Pp11 after correction, and the output current io2 of the second DC-DC converter 21 becomes the current value 12 indicated by the white circle P2 in accordance with the droop characteristic Dp12 after correction, for example. In this manner, when load change occurs, current imbalance occurs between the first DC-DC converter 11 and the second DC-DC converter 21, and the first DC-DC converter 11 may have a peak (overshoot) in its output current.

FIGS. 3A and 3B are diagrams for describing the correction of the slope of the droop characteristic in the present example.

As illustrated in FIG. 3A, the droop characteristic Dp01 of the first DC-DC converter 11 before correction, the droop characteristic Dp02 of the second DC-DC converter 21 and the droop characteristic Dpd of the designed value are the same as those illustrated in FIG. 2A.

It should be noted that, in the present example, the droop characteristic is extended to the left side of the vertical axis representing no load, and the slope of the droop characteristic is corrected with the intersection SP with the reference line SL that is parallel to the vertical axis at a position shifted by I0 to the left side of the vertical axis as a reference. When R represents the slope of the droop characteristic Dpd of the designed value, the voltage value at the intersection of the droop characteristic Dpd of the designed value and the vertical axis representing no load decreases by R*I0 in comparison with the voltage value at the intersection SP of the extension of the droop characteristic Dpd of the designed value and the reference line SL. Here, the output currents io1 and io2 to be subjected to the droop control change in the region where the value of the current i is positive on the right side of the v-axis or on the control v-axis. The left side of the v-axis to which the droop characteristic Dpd of the designed value is extended is a region where the value of the current i is negative. In a case of correcting the slope of the droop characteristic Dpd of the designed value, the intersection SP remains unchanged in its current and voltage values before and after the slope correction, i.e., it serves as the reference point for the slope correction of the droop characteristic Dpd of the designed value. Such a value of the current i at the intersection SP is set to a value shifted from the range of the values of the output currents io1 and io2 to be subjected to the above-described droop control. At this time, the portion of the droop characteristic Dpd of the designed value that is extended to the left side of the v-axis region does not correspond to the actual droop control, but is a virtually set region for the slope correction, and the negative current i itself does not have physical meaning.

FIG. 3B illustrates an example in which the slope of the droop characteristic is corrected on the basis of an intersection of the droop characteristic and the reference line SL. Here, the droop characteristic Dp21 of the first DC-DC converter 11 after correction is indicated by the thick solid line, and the droop characteristic Dp22 of the second DC-DC converter 21 after correction is indicated by the thick broken line. As with prior art, even when the droop characteristic is corrected in the light load state indicated by the black circle P1, the slope of the droop characteristic after correction becomes smaller than in the case where the intersection of the droop characteristic Dpd of the designed value and the vertical axis is used as a reference by correcting the slope of the droop characteristic Dpd of the designed value in the state where the current and voltage values of the intersection SP of the droop characteristic Dpd of the designed value and the reference line SL are kept with no change with the intersection SP of the droop characteristic Dpd of the designed value and the reference line SL as a reference. In this manner, when the load change has occurred as in the case described with reference to FIG. 2B, the output current io1 of the second DC-DC converter 21 becomes the current value 111 indicated by the white circle P5 in accordance with the droop characteristic Dp21 after correction, and the output current io2 of the second DC-DC converter 21 becomes the current value 112 indicated by the white circle P4 in accordance with the droop characteristic Dp22 after correction. Specifically, even when load change has occurred, the current imbalance can be suppressed between the first DC-DC converter 11 and the second DC-DC converter 21, and the peak of the output current can be suppressed.

Figure 4A:
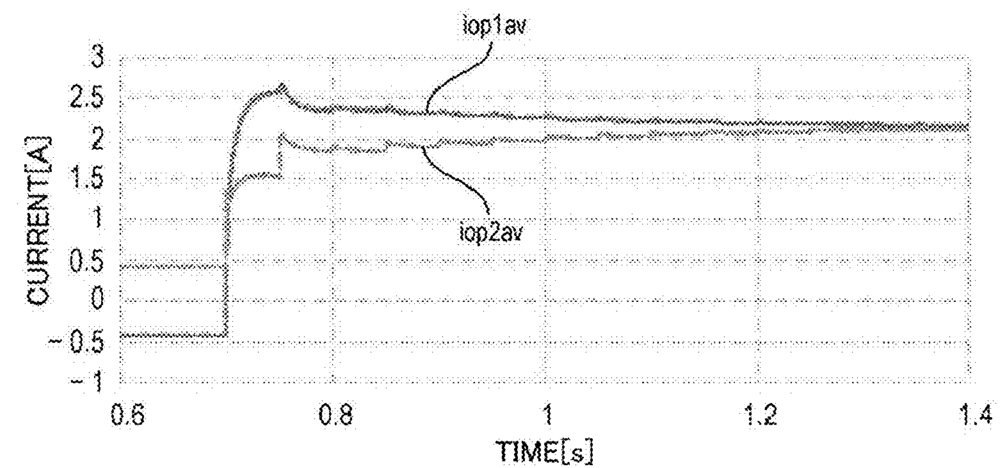
FIG. 4 are diagrams illustrating an output current average value of the DC power supply system according to Example 1 of the present invention and prior art.
Figure 4B:
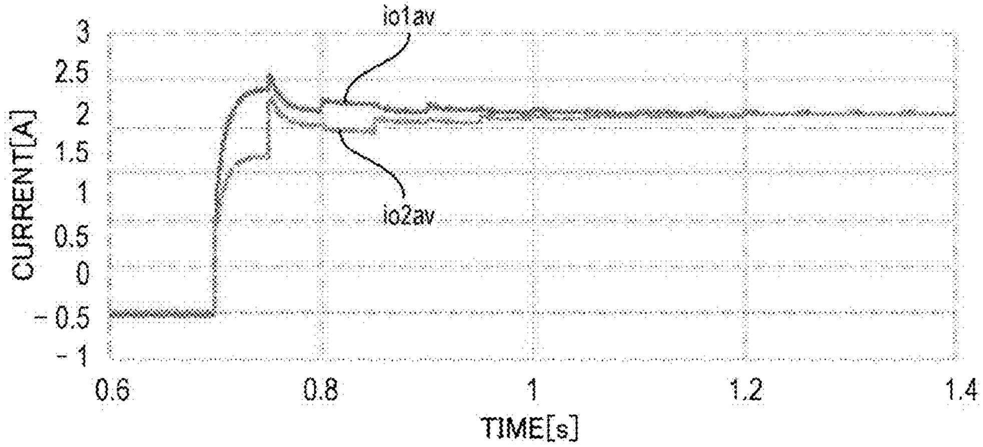

FIGS. 4A and 4B illustrate a change in output current in response to a change from a light load to a heavy load in a case where two DC-DC converters are operated in parallel as illustrated in FIG. 1. For comparison, FIG. 4A illustrates an output current average value iop1*av* of the first DC-DC converter 11 and an output current average value iop2*av* of the second DC-DC converter 21 in a case where the droop characteristic is corrected by using prior art. As illustrated in FIG. 4A, with the method of the prior art, the output current imbalance between the first DC-DC converter 11 and the second DC-DC converter 21 improves over time, but it can be observed that a peak appears in the output current average value of the first DC-DC converter 11 immediately after the load change.

FIG. 4B illustrates the output current average value io1*av* of the first DC-DC converter 11 and the output current average value io2*av* of the second DC-DC converter 21 in a case where the correction of the droop characteristic according to the present example is performed. The output current imbalance between the first DC-DC converter 11 and the second DC-DC converter 21 is more quickly improved than in the method of the prior art, the current peak of the output current average value of the first DC-DC converter 11 is reduced more than in the method of the prior art.

Figure 5A:
FIG. 5 are diagrams illustrating an output current average value of a DC-DC converter according to Example 1 of the present invention and prior art.
Figure 5A:
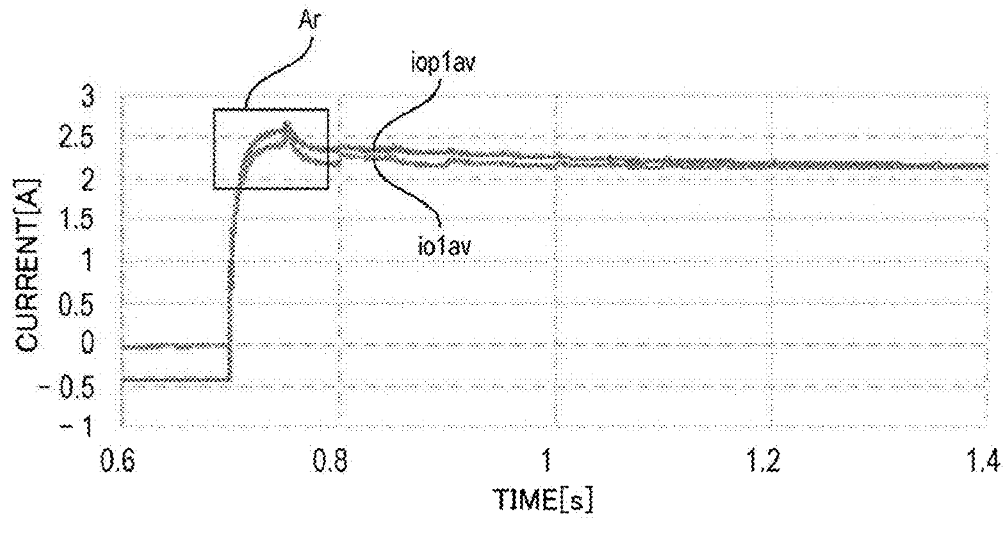
Figure 5B:
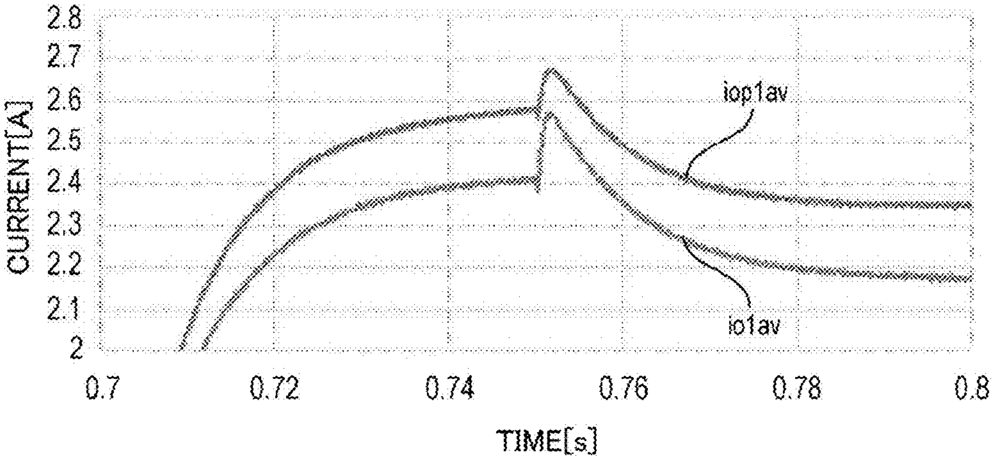

FIG. 5A illustrates the output current average value iop1*av* of the first DC-DC converter 11 in a case where the correction of the droop characteristic is performed by using the prior art, and the output current average value io1*av* of the first DC-DC converter 11 in a case where the correction of the droop characteristic according to the present example is performed. FIG. 5B is an enlarged graph of a region Ar enclosed by a rectangle in FIG. 5A. As clearly illustrated in FIG. 5B, in a case where the correction of the droop characteristic according to the present example is performed, the current peak is reduced more than in the method of the prior art.

As described above, at the droop reference shift setting unit 222, the output current shift amount, which is the shift amount of the reference point for correcting the slope of the droop characteristic, may be set to a predetermined value, but may be dynamically set during operation of the DC power supply system 100 as described below. Such a dynamic setting of the output current shift amount is also applicable to Examples 2 and 3 described later.

(1) The magnitude of the output current shift amount is changed in accordance with the magnitude of the output current.

Figure 6:
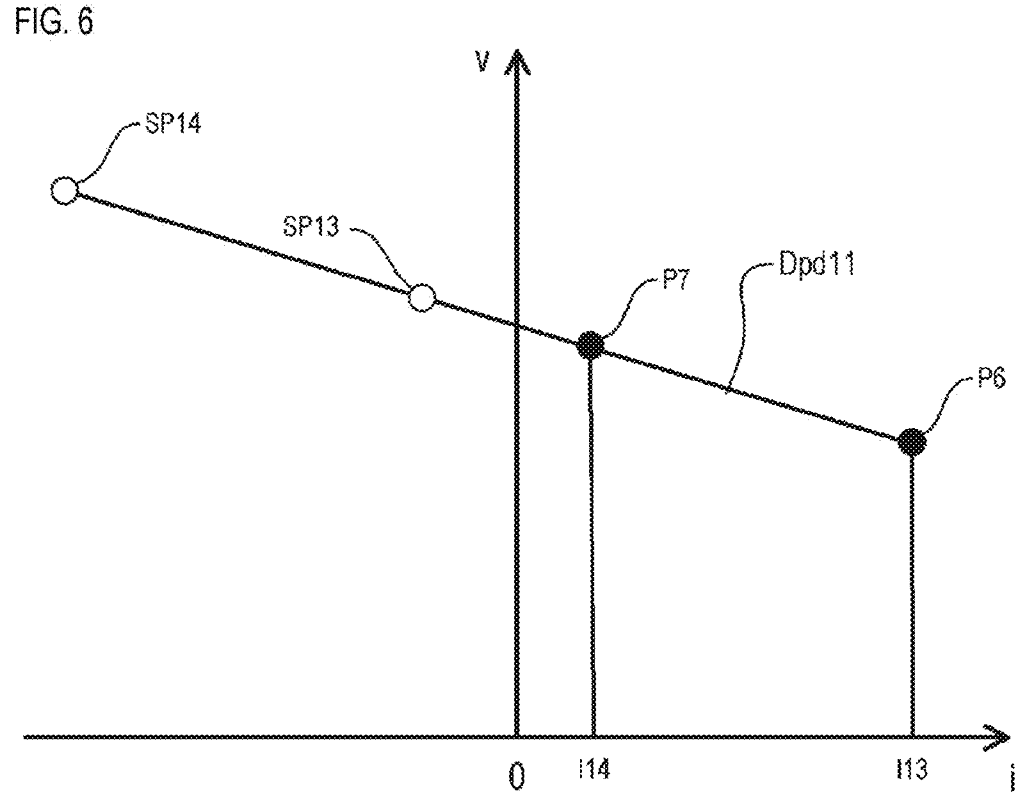
FIG. 6 is a diagram for describing dynamic setting of a reference point shift amount according to Example 1 of the present invention.

FIG. 6 illustrates an example in which the output current shift amount is set in accordance with the magnitude of the output current. In FIG. 6, a straight line Dpd11 indicated by the solid line indicates the droop characteristic of the designed value. In a case where an output current value 113 is large as indicated by a point P6, the output current shift amount is set to a small value such that reference point SP13 for correcting the slope is set to a position close to a no load state. Then, in a case where the output current value 114 is small as indicated by a point P7, the output current shift amount is set to a large value, and a reference point SP14 for correcting the slope is set near the negative rated current, for example.

By setting the output current shift amount in this manner, it is possible to correct the current under a light load as indicated by point P1 in FIG. 3B while preventing the slope correction amount from becoming excessively large or small.

Instead of the above-described output current, the magnitude of the output current shift amount may be changed in the same manner in accordance with the magnitude of the load factor.

(2) The output current shift amount is changed in accordance with the slope correction amount.

The droop reference shift setting unit 222 acquires the correction amount of the slope of the droop characteristic from the droop slope correction computation unit 221, and if the correction amount of the slope of the droop characteristic becomes excessively large, the droop reference shift setting unit 222 sets the reference point for correcting the slope at a position farther from the no load state by setting the output current shift amount to a large value. In this manner, in the region where the droop control is applied, it is possible to prevent the correction amount of the slope of the droop characteristic from becoming excessively large.

Conversely, if the correction amount of the slope of the droop characteristic becomes excessively small, the reference point for correcting the slope is set to a position close to a no load state by setting the output current shift amount to a small value. In this manner, in the region where the droop control is applied, it is possible to prevent the correction amount of the slope of the droop characteristic from becoming excessively small.

The method of dynamically setting the output current shift amount may be set in accordance with the output voltage, and the above-described case is not limitative.

Example 2

Now a DC power supply system of the present invention according to Example 2 is described. The same configurations as those of the DC power supply system 100 according to Example 1 are denoted with the same reference numerals, and the description thereof is omitted. Example 2 is the same in terms of the configuration in which two DC-DC converters are connected in parallel to the load 3. In the DC power supply system 100 according to Example 1, the slope correction of the droop characteristic according to Example 1, i.e., the correction in which the reference point is shifted in a case of correcting the slope of the droop characteristic is performed at both the first DC-DC converter 11 and the second DC-DC converter 21 connected in parallel to the load 3. In Example 2, one of the two converters connected in parallel, e.g., the second DC-DC converter 21 performs the slope correction of the droop characteristic according to Example 1, whereas the first DC-DC converter 11 performs a known correction of the slope of the droop characteristic, i.e., correction in which the reference point is fixed in a case of correcting the slope of the droop characteristic. More specifically, the first DC-DC converter 11 according to the present example has a configuration in which the droop reference shift setting unit 222, the summation point 225 and the summation point 226 are omitted in the configuration of the control unit 22 of the second DC-DC converter 21 illustrated in FIG. 1. Here, the second DC-DC converter 21 corresponds to the first-type power conversion device of the present invention. Further, the first DC-DC converter 11 corresponds to the first-type power conversion device of the present invention. In addition, the output line PwL1 corresponds to the second-type power line of the present invention, an output voltage vo1 as the voltage between the output lines PwL1 corresponds to the second-type voltage of the present invention, and the output current io1 flowing through the output line PwL1 corresponds to the second-type physical quantity and the current flowing through the second-type power conversion device of the present invention. In addition, the configurations corresponding to the control unit, first DC-DC converter output current detection circuit and first DC-DC converter voltage detection circuit provided in the first DC-DC converter 11 correspond to the second-type control unit, second-type physical quantity acquiring unit, and second-type voltage acquiring unit of the present invention. Further, the droop characteristic of the first DC-DC converter 11 corresponds to the second-type droop characteristic of the present invention, the droop control corresponding to this corresponds to the second-type droop control of the present invention, the configuration corresponding to the droop gain multiplier 223 and the summation point 227 corresponds to the second-type droop control unit of the present invention, and the configuration corresponding to the droop slope correction computation unit 221 corresponds to the second-type characteristic slope correction unit of the present invention. In addition, the second-type control unit of the present invention does not include configurations corresponding to the droop reference shift setting unit 222, the summation point 225 and the summation point 226.

Figure 7A:
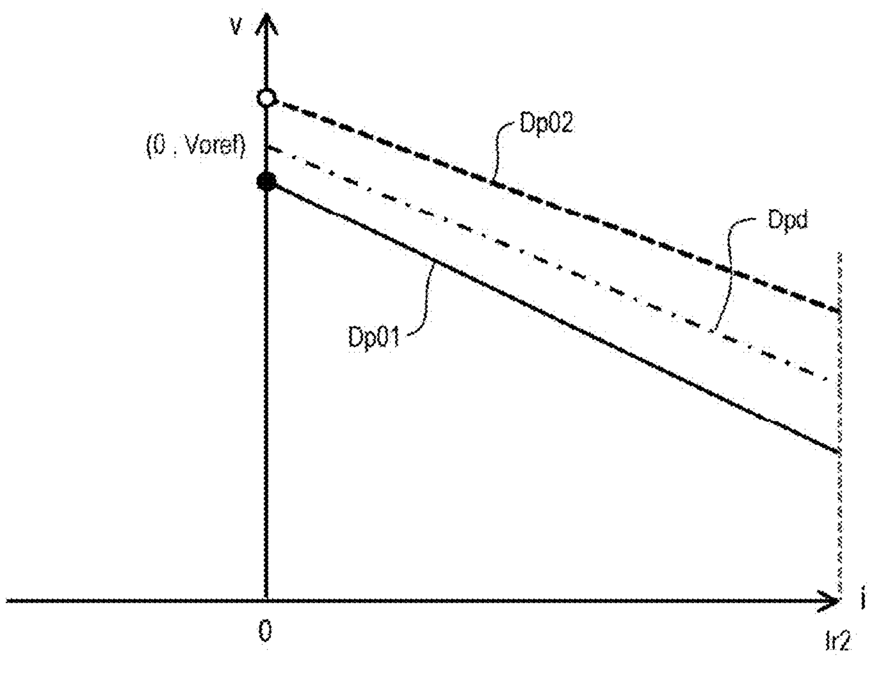
FIG. 7 are diagrams for describing the correction of droop control according to Example 2 of the present invention.

For comparison, FIG. 7A illustrates the droop characteristic Dp01 of the first DC-DC converter 11, the droop characteristic Dp02 of the second DC-DC converter 21, and the droop characteristic Dpd of the designed value in a case where a known slope correction of the droop characteristic is performed at both the first DC-DC converter 11 and the second DC-DC converter 21. In the droop characteristic Dpd of the designed value, the value at the intersection (intercepts) with the vertical axis representing no load is the DC bus voltage command value Voref, and a current value Ir2 indicates the rated current value of the second DC-DC converter 21. Both the droop characteristic Dp01 of the first DC-DC converter 11 indicated by the solid line and the droop characteristic Dp02 of the second DC-DC converter 21 indicated by the broken line deviate from the droop characteristic Dpd of the designed value indicated by the single dotted line due to detection variations and the like.

Both the first DC-DC converter 11 and the second DC-DC converter 21 have a capacity of 1.5 KW, and when the intersection (0, Voref) with the vertical axis is set as the reference point, the peak current value of the first DC-DC converter 11 was 2.68 A and the peak current value of the second DC-DC converter 21 was 2.08 A.

Figure 7B:
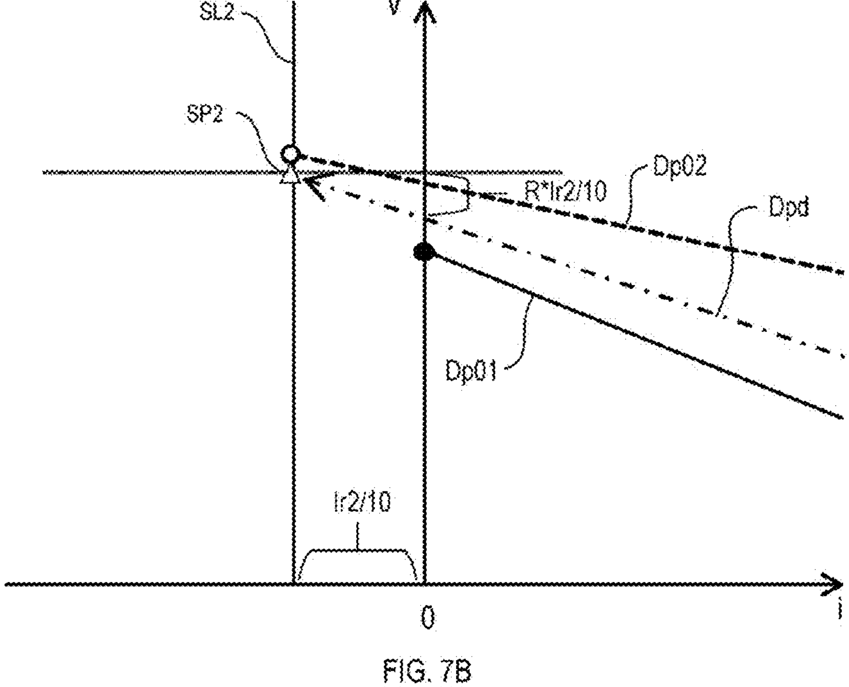

Conversely, as illustrated in FIG. 7B, in a case where the reference point (0, Voref) of the slope correction of the droop characteristic Dp01 of the first DC-DC converter 11 is not changed, whereas the reference point of the slope correction of the droop characteristic Dp02 is set to an intersection SP2(−(Ir2/10), Voref+R*(Ir2/10)) with a straight line SL2 that is parallel to the vertical axis and is shifted by Ir2/10 to the left side from the vertical axis only for the second DC-DC converter 21, the peak current value of the first DC-DC converter 11 was 2.58 A and the peak current value of the second DC-DC converter 21 was 2.2 A. Here, regarding the droop characteristic Dp02 of the second DC-DC converter 21, the output current io2 subjected to the droop control changes in the region where the value of the output current io2 is positive on the right side of the v-axis or on the v-axis. The left side of the v-axis to which the droop characteristic Dpd of the designed value is extended is a region where the output current io2 is negative. In a case of correcting the slope of the droop characteristic Dpd of the designed value, the intersection SP2 is the reference point for the slope correction of the droop characteristic Dpd of the designed value and remains unchanged in its current and voltage values before and after the slope correction. The value of the output current io2 at such an intersection SP2 is set to a value shifted with respect to the range of the value of the output current io2 to be subjected to the droop control. At this time, the portion of the droop characteristic Dpd of the designed value that is extended to the left side of the v-axis region does not correspond to the actual droop control, but is a region virtually set for the slope correction, and the negative output current io2 does not have physical meaning.

In this manner, the peak current value can be reduced also in a DC power supply system with a configuration in which the slope correction of the droop characteristic according to Example 1 is performed on some of the DC-DC converters connected in parallel. Here, the intersection SP2 corresponds to the reference point of the present invention.

Example 3

Now a DC power supply system according to Example 3 of the present invention is described. The same configurations as those of the DC power supply system 100 according to Example 1 are denoted with the same reference numerals, and the description thereof is omitted. Example 3 is the same in terms of the configuration in which two DC-DC converters are connected in parallel to the load 3. In Example 3, as in the DC power supply system 100 according to Example 1, the slope correction of the droop characteristic according to Example 1, i.e., the correction in which the reference point is shifted in a case of correcting the slope of the droop characteristic is performed at both the first DC-DC converter 11 and the second DC-DC converter 21 connected in parallel to the load 3. It should be noted that, in Example 3, the power capacity of the first DC-DC converter 11 and the power capacity of the second DC-DC converter 21 are different from each other. The following describes an example in which the power capacity of the first DC-DC converter 11 is 1.5 kW and the power capacity of the second DC-DC converter 21 is 3 KW, but the power capacities of the DC-DC converters are not limited to these values.

Figure 8A:
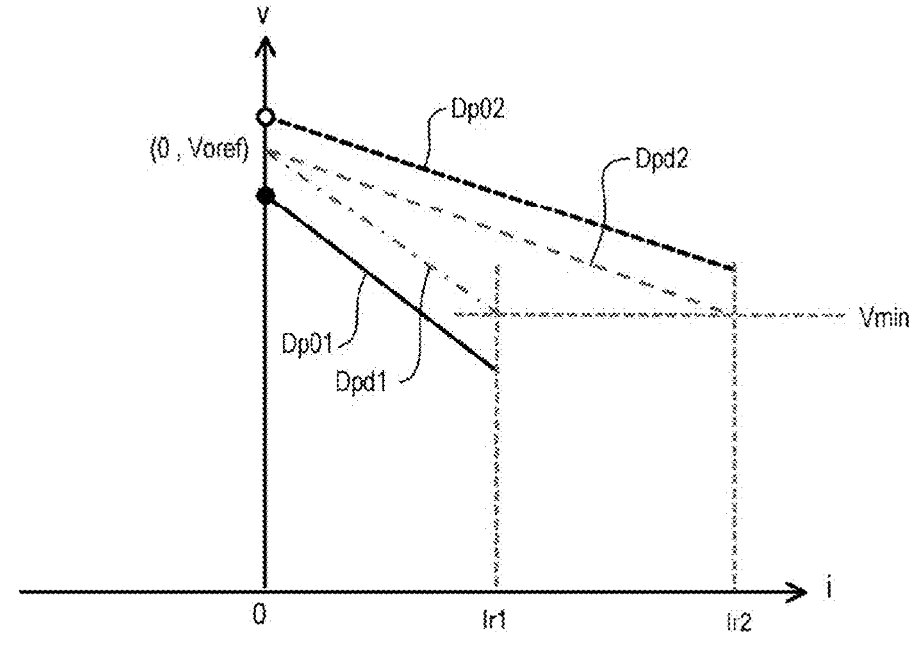
FIG. 8 are diagrams for describing the correction of droop control according to Example 3 of the present invention.

FIG. 8A illustrates the droop characteristic before correction of the first DC-DC converter 11 and the second DC-DC converter 21 according to Example 3. The droop characteristic Dp01 of the first DC-DC converter 11 is indicated by the solid line, and a droop characteristic Dpd1 of the designed value of the first DC-DC converter 11 is indicated by the single dotted line. In addition, the droop characteristic Dp02 of the second DC-DC converter 21 is indicated by the broken line with narrow intervals (referred to as "narrow broken line"), and a droop characteristic Dpd2 of the designed value of the second DC-DC converter 21 is indicated by the broken line with wide intervals (referred to as "wide broken line"). In addition, in FIG. 8A, Ir1 represents the rated current value of the first DC-DC converter 11, and Ir2 represents the rated current value of the second DC-DC converter 21. In this manner, in a case where droop control is performed between DC-DC converters with different power capacities, the rated voltage Vmin is often aligned. Therefore, in the present Example 3, as illustrated in FIG.

8A, for the droop characteristic Dpd1 of the designed value of the first DC-DC converter 11 and the droop characteristic Dpd2 of the designed value of the second DC-DC converter 21, the voltage values at their rated current values Ir1 and Ir2 are aligned to Vmin. Note that, the droop characteristic Dp01 of the first DC-DC converter 11 and the droop characteristic Dp02 of the second DC-DC converter 21 deviate from the designed value due to detection variations and the like.

For comparison, in the droop characteristic DC power supply system as illustrated in FIG. 8A, for the first DC-DC converter 11 and the second DC-DC converter 21, in a case where a known control of correcting the slope of the droop characteristic is performed with the intersection (0, Voref) with the vertical axis representing no load fixed, the peak current value of the first DC-DC converter 11 was 3.02 A, and the peak current value of the second DC-DC converter 21 was 4.32 A (corresponding to 2.16 A when converted based on a 1.5 kW power capacity).

Figure 8B:
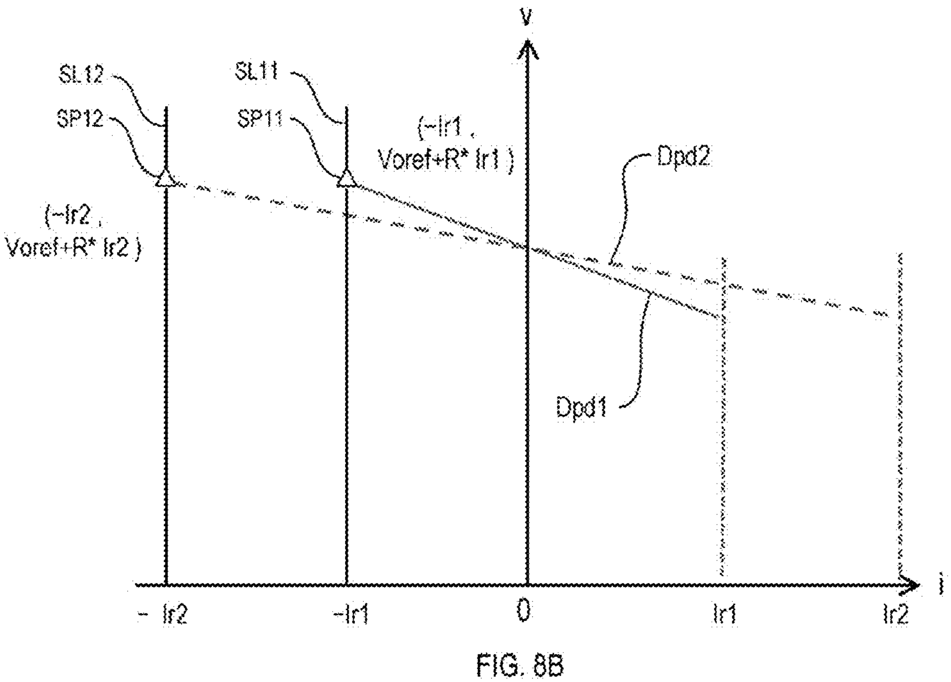

FIG. 8B illustrates a droop characteristic in a case where a control in which the reference point for correcting the slope of the droop characteristic is shifted as in Example 1 is performed for the first DC-DC converter 11 and the second DC-DC converter 21. While FIG. 8B illustrates only the droop characteristic Dpd1 of the designed value of the first DC-DC converter 11 and the droop characteristic Dpd2 of the designed value of the second DC-DC converter 21 for the sake of clarity, the droop characteristics of the first DC-DC converter 11 and the second DC-DC converter 21 are straight lines shifted from respective designed values as in Example 1.

Here, for the droop characteristic Dpd1 of the designed value of the first DC-DC converter 11, the slope is corrected with an intersection SP11 (−Ir1, Voref+R*Ir1), as a reference point, with a straight line SL11 that is parallel to the vertical axis shifted to the left side by a rated current value Ir1 of the first DC-DC converter 11, and for the droop characteristic Dpd2 of the designed value of the second DC-DC converter 21, the slope is corrected with an intersection SP12 (−Ir2, Voref+R*Ir2), as a reference point, with a straight line SL12 that is parallel to the vertical axis shifted to the left side by a rated current value Ir2 of the second DC-DC converter 21. At this time, the peak current value of the first DC-DC converter 11 was 2.85 A, and the peak current value of the second DC-DC converter 21 was 47 A (corresponding to 2.35 A when converted based on a power capacity of 1.5 KW). Here, regarding the droop characteristic Dpd2 of the designed value of the second DC-DC converter 21, the output current io2 subjected to the droop control changes in a region up to the rated current value Ir2 where the value of the output current io2 is positive on the right side of the v-axis or on the v-axis. The left side of the v-axis to which the droop characteristic Dpd2 of the designed value is extended is a region where the output current io2 is negative. In a case of correcting the slope of the droop characteristic Dpd2 of the designed value, the intersection SP12 is a reference point of the slope correction of the droop characteristic Dpd2 of the designed value that remains unchanged in its current and voltage values before and after the slope correction. The value of the output current io2 at such an intersection SP12 is set to a value shifted with respect to the range of the value of the output current io2 to be subjected to the droop control. In this case, the part of the droop characteristic Dpd2 of the designed value that is extended to the left side of the v-axis region does not correspond to the actual droop control is the region virtually set for the slope correction, and the negative output current io2 does not have physical meaning. Likewise, regarding the droop characteristic Dpd1 of the designed value of the first DC-DC converter 11, the output current io1 subjected to the droop control changes in the region up to the rated current value Ir1 where the value of the output current io1 is positive on the right side of the v-axis or on the v-axis. The left side to which the droop characteristic Dpd1 of the designed value is extended is a region where the v-axis output current io1 is negative. In a case of correcting the slope of the droop characteristic Dpd1 of the designed value, the intersection SP11 is the reference point of the slope correction of the droop characteristic Dpd1 of the designed value that remains unchanged in its current and voltage values before and after the slope correction. The value of the output current io1 at such an intersection SP11 is set to a value shifted with respect to the range of the value of the output current io1 to be subjected to the droop control. In this case, the part of the droop characteristic Dpd1 of the designed value that is extended to the left side of the v-axis region does not correspond to the actual droop control but is the region virtually set for the slope correction, and the negative output current io1 does not have physical meaning.

In this manner, in the DC power supply system according to Example 3, the peak current value of the first DC-DC converter 11 can be suppressed to a smaller value than in a known method. Here, the intersection SP11 and the intersection SP12 each correspond to the reference point of the present invention.

Variation 1

In the above-described examples, a droop control in which discharging from the storage battery 13 connected to the first DC-DC converter 11 and the storage battery 23 connected to the second DC-DC converter 21 is performed, but the same droop control can be achieved also when the storage battery 13 and the storage battery 23 are charged, such as when DC power is supplied from a DC power supply source connected to the DC bus DCb to the storage battery 13 and the storage battery 23, for example. The DC power supply source may be, but is not limited to, an apparatus that includes an AC-DC converter that converts, into DC power, AC power supplied from an AC power source such as a commercial power system connected to the DC bus DCb, or an apparatus that includes a DC power source such as a storage battery, a solar battery and a fuel cell and a DC-DC converter that steps-up, steps-up and steps-down, or steps-down the output of the DC power source.

In the droop control in the above-described example, in a case where discharging from the storage battery 13 and the storage battery 23 is performed, the output current io1 of the first DC-DC converter 11 and the output current io2 of the second DC-DC converter 21 flow in the arrow direction illustrated in FIG. 1, and their output currents have positive values. Conversely, in a case where charging of the storage battery 13 and the storage battery 23 is performed, the output current io1 of the first DC-DC converter 11 and the output current io2 of the second DC-DC converter 21 flow in the direction opposite to the arrow direction illustrated in FIG. 1. As such, in a case where the current flows in the direction opposite to the arrow direction illustrated in FIG. 1, each output current has a negative value.

In this case, the droop characteristics of the first DC-DC converter 11 and the second DC-DC converter 21 have a shape in which the graph of the droop characteristic of the above-described example is inverted in sign around the vertical axis at i=0. Accordingly, in a case where charging of the storage battery 13 and the storage battery 23 is performed, the reference point for correcting the slope of the droop characteristic for the negative current region on the left side of the vertical axis in the droop control of the above-described examples is set to the intersection with the straight line parallel to the vertical axis shifted to the positive region on the right side of the vertical axis. In this manner, the droop control of the above-described examples can be applied also to a case where charging of the storage battery 13 and the storage battery 23 is performed, the peak current values of the output current io1 and the output current io2 can be suppressed to a small value, and the imbalance between the output current io1 and the output current io2 can be suppressed.

In addition, as in Example 2, in a case where only the second DC-DC converter 21 performs the droop control according to the present variation 1, the second DC-DC converter 21 corresponds to the first-type power conversion device of the present invention.

Variation 2

As described in Variation 1, in a case where the DC power source that supplies DC power through the first DC-DC converter 11 and the second DC-DC converter 21 is the storage battery 13 and the storage battery 23, the droop control according to Examples 1 to 3 can be performed not only in a case where discharging from the storage batteries 13 and 23 is performed, but also in a case where charging of the storage batteries 13 and 23 is performed.

Therefore, in a case where the DC power source that supplies DC power through the second DC-DC converter 21 is the storage battery 23, the droop control according to Examples 1 to 3 may be performed only in a case where discharging from the storage battery 23 is performed, or only in a case where charging of the storage battery 23 is performed. In addition, in a case where the control unit 22 performs discharging of the storage battery 23 in accordance with the switching of charging and discharging of the storage battery 23, the reference point of the slope correction of the droop characteristic may be shifted to the negative region because the output current io2 flows in the positive direction (the arrow direction in FIG. 1), whereas in a case where charging of the storage battery 23 is performed, the reference point of the slope correction of the droop characteristic may be shifted to the positive region because the output current io2 flows to the negative direction (the direction opposite to the arrow direction in FIG. 1). The same applies to the first DC-DC converter 11.

Variation 3

In the above-described examples, the droop characteristic that defines the relationship between the output voltage vo2 and the output current io2 detected at the second DC-DC converter output current detection circuit 25 is described, but regarding the droop characteristic, the correction of the droop characteristic can be performed in the same manner also for the droop control according to the droop characteristic that defines the relationship between the output power detection (here, po2) and the output voltage. In a DC power supply system that performs such a droop control, a second DC-DC converter output power acquiring unit is provided, which calculates the output power po2 by multiplying the output current io2 detected by the second DC-DC converter output current detection circuit 25 by the output voltage vo2 detected by the second DC-DC converter output voltage detection circuit 24, for example. The details of the droop control and correction of the droop characteristic are the same as those of the above-described examples using the output current, and therefore the description thereof is omitted. Here, the output power po2 corresponds to the power and physical quantity of the present invention, and the second DC-DC converter output power acquiring unit corresponds to the physical quantity acquiring unit of the present invention.

Variation 4

In the above-described examples, as illustrated in FIG. 1 according to Example 1, the second DC-DC converter output current detection circuit 25 and the second DC-DC converter output voltage detection circuit 24 are provided at the output line PwL2 of the second DC-DC converter 21, and the current flowing through the output line PwL2 and the voltage between the output lines PwL2 are detected and acquired.

However, the configuration that can acquire the output voltage and the output current of the second DC-DC converter 21 is not limited to this. Specifically, the output current and output voltage can be acquired by performing conversion and estimation on the basis of various detection values and information related to the second DC-DC converter 21 (the same applies to other DC-DC converters making up the DC power supply system 100).

For example, since the second DC-DC converter 21 retains the duty value of its own PWM, it is possible for a step-up converter to perform conversion to the output voltage and output current on the basis of the step-up ratio and the like. In the case of the step-up converter, the same applies to the average value of the input current and the average value of the inductor current. If losses and the like can be evaluated in advance, the accuracy of the conversion can be further improved.

In addition, by detecting the current flowing through components such as the inductor, switch, and capacitor of the second DC-DC converter 21, it is also possible to estimate the input and output voltages.

Accordingly, the configuration corresponding to the voltage acquiring unit and the physical quantity acquiring unit of the present invention only needs to be capable of ultimately acquiring the voltage and physical quantity of the present invention. It is not limited to the configurations described in the examples but also includes configurations in which the voltage and physical quantity are obtained through conversion or estimation from various detected values and information.

Supplementary Note 1

A power conversion device (21) connected to a DC power source (23) and configured to step-up, step-up and step-down, or step-down DC power and then output the DC power, the power conversion device (21) being connected to a load (3) through a power line (PwL2) in parallel to another power conversion device (11) connected to another DC power source (13) and configured to step-up, step-up and step-down, or step-down DC power, the power conversion device (21) including:

- a physical quantity acquiring unit (24) configured to acquire a physical quantity that is power or current flowing through the power conversion device (21);
- a voltage acquiring unit (24) configured to acquire a voltage of the power line (PwL2); and
- a first control unit (22) configured to control the voltage of the power line.

The control unit (22) includes:

- a droop control unit (223, 227) configured to perform a droop control of reducing the voltage of the power line in accordance with a droop characteristic that defines a relationship between the physical quantity and the voltage, a characteristic slope correction unit (221) configured to correct a slope of the droop characteristic with respect to the physical quantity, and a characteristic reference shift setting unit (222, 225, 226) configured to shift a reference point where the voltage and the physical quantity on the droop characteristic do not change when the slope of the droop characteristic is corrected.

REFERENCE SIGNS

3: Load
11: First DC-DC converter
21: Second DC-DC converter
22: Control unit
221: Droop slope correction computation unit
222: Droop reference shift setting unit
223: Droop gain multiplication unit
225, 226, 227: Summation point
100: DC power supply system

The invention claimed is:

1. A power conversion device connected to a DC power source and configured to step-up, step-up and step-down, or step-down DC power and then output the DC power, the power conversion device being connected to a load through a power line in parallel with another power conversion device connected to another DC power source and configured to step-up, step-up and step-down, or step-down DC power, the power conversion device comprising:

a physical quantity acquiring unit configured to acquire a physical quantity that is power or current flowing through the power conversion device;

a voltage acquiring unit configured to acquire a voltage of the power line; and a control unit configured to control the voltage, wherein the control unit includes:

a droop control unit configured to perform a droop control of reducing the voltage of the power line in accordance with a droop characteristic that defines a relationship between the physical quantity and the voltage, a characteristic slope correction unit configured to correct a slope of the droop characteristic with respect to the physical quantity, and a characteristic reference shift setting unit configured to shift a reference point where the voltage and the physical quantity on the droop characteristic do not change when the slope of the droop characteristic is corrected.

2. The power conversion device according to claim 1, wherein the characteristic reference shift setting unit changes a direction of shifting the reference point with respect to a range of a value of the physical quantity to be subjected to the droop control in accordance with a direction of the physical quantity flowing through the power conversion device.

3. The power conversion device according to claim 1, wherein the characteristic reference shift setting unit dynamically sets a shift amount of the reference point.

4. The power conversion device according to claim 1, wherein the characteristic reference shift setting unit sets a shift amount of the reference point, based on a power capacity of the power conversion device.

5. The power conversion device according to claim 1, further comprising a communication unit configured to acquire another physical quantity that is power or current flowing through the other power conversion device, wherein the control unit determines a command value of the physical quantity in the power conversion device, based on the physical quantity and the other physical quantity.

6. A DC power supply system comprising a plurality of power conversion devices each connected to a DC power source and configured to step-up, step-up and step-down, or step-down DC power and supply the DC power to a load, the plurality of power conversion devices being connected in parallel to the load, wherein the plurality of power conversion devices include a first-type power conversion device, the first-type power conversion device includes:

a physical quantity acquiring unit configured to acquire a physical quantity that is power or current flowing through the first-type power conversion device, a voltage acquiring unit configured to acquire a voltage of a power line that connects the first-type power conversion device and the load, and a control unit configured to control the voltage, and the control unit includes:

a droop control unit configured to perform a droop control of reducing the voltage in accordance with a droop characteristic that defines a relationship between the physical quantity and the voltage, a characteristic slope correction unit configured to correct a slope of the droop characteristic with respect to the physical quantity, and a characteristic reference shift setting unit configured to shift a reference point where the voltage and the physical quantity on the droop characteristic do not change when the slope of the droop characteristic is corrected.

7. The DC power supply system according to claim 6, wherein the plurality of power conversion devices include a second-type power conversion device, the second-type power conversion device includes:

a second-type physical quantity acquiring unit configured to acquire a second-type physical quantity that is power or current flowing through the second-type power conversion device, a second-type voltage acquiring unit configured to acquire a second-type voltage that is a voltage of a second-type power line that connects the second-type power conversion device and the load, and a second-type control unit configured to control the second-type voltage, and the second-type control unit includes:

a second-type droop control unit configured to perform a second-type droop control of reducing the second-type voltage in accordance with a second-type droop characteristic that defines a relationship between the second-type physical quantity and the second-type voltage, and a second-type characteristic slope correction unit configured to correct a slope of the second-type droop characteristic with respect to the second-type physical quantity.

8. The DC power supply system according to claim 6, wherein the characteristic reference shift setting unit changes a direction of shifting the reference point with respect to a range of a value of the physical quantity to be subjected to the droop control in accordance with a direction of the physical quantity flowing through the first-type power conversion device.

9. The DC power supply system according to claim 6, wherein the characteristic reference shift setting unit dynamically sets a shift amount of the reference point.

10. The DC power supply system according to claim 6, wherein the characteristic reference shift setting unit sets a shift amount of the reference point, based on a power capacity of the first-type power conversion device.

11. The DC power supply system according to claim 6, wherein the first-type power conversion device further includes a communication unit configured to acquire another physical quantity that is power or current flowing through another power conversion device included in the DC power supply system, and the control unit determines a command value of the physical quantity in the first-type power conversion device, based on the physical quantity and the other physical quantity.

* * * * *